(12) United States Patent
Magana Casado et al.

(10) Patent No.: US 8,744,649 B2
(45) Date of Patent: Jun. 3, 2014

(54) PROVIDING A DESCRIPTION OF AIRCRAFT INTENT

(71) Applicant: The Boeing Company, Chicago, IL (US)

(72) Inventors: Enrique Juan Magana Casado, Madrid (ES); Francisco Navarro, Madrid (ES); Juan Alberto Besada, Madrid (ES); Javier Lopez Leones, Madrid (ES); Miguel Vilaplana, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/901,603

(22) Filed: May 24, 2013

(65) Prior Publication Data

US 2013/0317670 A1    Nov. 28, 2013

(30) Foreign Application Priority Data

May 24, 2012  (EP) ..................................... 12382196

(51) Int. Cl.
  *B64C 19/00*  (2006.01)
  *G08G 5/02*   (2006.01)
  *G05D 1/10*   (2006.01)

(52) U.S. Cl.
  CPC ............... *B64C 19/00* (2013.01); *G05D 1/101* (2013.01); *G08G 5/025* (2013.01)
  USPC .......................................................... 701/3

(58) Field of Classification Search
  CPC ........ B64C 19/00; G05D 1/101; G08G 5/025; G08G 5/0017
  USPC .......................................................... 701/3
  See application file for complete search history.

(56) References Cited

U.S. PATENT DOCUMENTS

| 6,885,340 | B2* | 4/2005 | Smith et al. ................... 342/465 |
| 6,950,037 | B1* | 9/2005 | Clavier et al. ................. 340/945 |
| 8,560,148 | B2* | 10/2013 | Torres et al. ...................... 701/3 |
| 8,594,917 | B2* | 11/2013 | Sawhill et al. ................ 701/122 |

(Continued)

FOREIGN PATENT DOCUMENTS

EP          2040137        3/2009

OTHER PUBLICATIONS

European International Search Report (Dec. 11, 2012).

(Continued)

*Primary Examiner* — Thomas Tarcza
*Assistant Examiner* — Alex C Dunn
(74) *Attorney, Agent, or Firm* — Klintworth & Rozenblat IP LLC (57) ABSTRACT

The present disclosure provides a computer-implemented method of generating a description of aircraft intent expressed in a formal language that provides an unambiguous description of an aircraft's intended motion and configuration during a period of flight. A flight intent description is parsed to provide instances of flight intent that span a flight segment, the flight segments together spanning the period of flight. The parsed flight intent is converted into parametric aircraft intent by generating an associated flight segment description for each flight segment that comprises instances of flight intent to close all associated degrees of freedom of motion and of configuration of the aircraft. At least some flight segment descriptions contain a parameter range, and the method further comprises optimizing the parametric aircraft intent by determining an optimal value for the parameter of each parameter range.

20 Claims, 6 Drawing Sheets

(56) References Cited

U.S. PATENT DOCUMENTS

| | | | |
|---|---|---|---|
| 2010/0305781 A1* | 12/2010 | Felix | 701/3 |
| 2012/0004837 A1* | 1/2012 | McDonald | 701/120 |
| 2012/0083946 A1* | 4/2012 | Maldonado et al. | 701/3 |
| 2012/0116614 A1* | 5/2012 | Torres et al. | 701/3 |
| 2013/0085661 A1* | 4/2013 | Chan et al. | 701/122 |
| 2013/0317734 A1* | 11/2013 | Vilaplana et al. | 701/301 |
| 2013/0332059 A1* | 12/2013 | del Pozo de Poza | 701/123 |
| 2013/0338909 A1* | 12/2013 | de Blanes et al. | 701/120 |
| 2013/0338910 A1* | 12/2013 | Vilaplana et al. | 701/122 |

OTHER PUBLICATIONS

Lopez-Leones, Javier, et al., "The Aircraft Intent Description Language: A key enabler for air-ground synchronization in Trajectory-Based Operations" Digital Avionics Systems Conference, 2007.

Marie-Dominique Dupuy, et al., "Preliminary results for a robust trajectory prediction method using advanced flight data", Digital Avionics Systems Conference, 2007.

* cited by examiner

PROVIDING A DESCRIPTION OF AIRCRAFT INTENT

PRIORITY STATEMENT

This application claims the benefit of EP Patent Application No. 12382196.9, filed on May 24, 2012 in the Spanish Patent Office, the disclosure of which is incorporated herein by reference in its entirety.

CROSS REFERENCE TO RELATED APPLICATIONS

This application is related to and incorporates herein by reference in its entirety, co-pending U.S. patent application Ser. No. 13,901,606, concurrently filed and entitled "Providing a Description of Aircraft Intent" which claims priority to EP Patent Application No. 12382194.4, filed on May 24, 2012 in the Spanish Patent Office.

This application is related to and incorporates herein by reference in its entirety, co-pending U.S. patent application Ser. No. 13/901,607, concurrently filed and entitled "Providing a Description of Aircraft Intent" which claims priority to EP Patent Application No. 12382195.1, filed on May 24, 2012 in the Spanish Patent Office.

FIELD OF THE INVENTION

The present disclosure relates to providing a method of forming a description of aircraft intent expressed using a formal language. Such a description allows the path of an aircraft to be predicted unambiguously.

BACKGROUND

The ability to predict an aircraft's trajectory is useful for several reasons. By trajectory, a four-dimensional description of the aircraft's path is meant. The description may be the evolution of the aircraft's state with time, where the state may include the position of the aircraft's centre of mass and other aspects of its motion such as velocity, attitude and weight.

For example, air traffic management (ATM) would benefit from an improved ability to predict an aircraft's four-dimensional trajectory. Air traffic management is responsible for the safe separation of aircraft, a particularly demanding task in congested airspace such as around airports. ATM decision-support tools based on accurate four-dimensional trajectory predictions could allow a greater volume of aircraft to be handled while maintaining safety.

The ability to predict an aircraft's four-dimensional trajectory will also be of benefit to the management of autonomous vehicles such as unmanned air vehicles (UAVs), for example in programming flight plans for UAVs as well as in commanding and de-conflicting their trajectories.

In order to predict an aircraft's four-dimensional trajectory unambiguously, one must solve a set of differential equations that model both aircraft behaviour and atmospheric conditions. Different sets of differential equations are available for use, some treating the aircraft as a six degrees of freedom of movement system and others treating the aircraft as a point mass with three degrees of freedom of movement. In addition, to solve the equations of motion, information concerning the aircraft's configuration is required as it will respond differently to control commands depending upon its configuration. Hence, further degrees of freedom of configuration may require definition that describe the configuration of the aircraft. For example, three degrees of freedom of configuration may be used to define landing gear configuration, speed brake configuration and lift devices configuration. Accordingly, aircraft intent may need to close six degrees of freedom to define an unambiguous trajectory, three degrees corresponding to motion of the aircraft in three axes and the other three degrees corresponding to aircraft configuration.

The computation process requires inputs corresponding to the aircraft intent, for example a description of aircraft intent expressed using a formal language. The aircraft intent provides enough information to predict unambiguously the trajectory that will be flown by the aircraft. The aircraft intent is usually derived from a description of flight intent, that is more-basic information that does not allow an unambiguous determination of aircraft trajectory. Aircraft intent may comprise information that captures basic commands, guidance modes and control inputs at the disposal of the pilot and/or the flight management system.

Aircraft intent must be distinguished from flight intent. Flight intent may be thought of as a generalisation of the concept of a flight plan, and so will reflect operational constraints and objectives such as an intended or required route and operator preferences. Generally, flight intent will not unambiguously define an aircraft's trajectory, as it is likely to contain only some of the information necessary to close all degrees of freedom. Put another way, there are likely to be many aircraft trajectories that could be calculated that would satisfy a given flight intent. Thus, flight intent may be regarded as a basic blueprint for a flight, but that lacks the specific details required to compute unambiguously a trajectory. Thus additional information must be combined with the flight intent to derive the aircraft intent that does allow an unambiguous prediction of the four-dimensional trajectory to be flown.

Aircraft intent is expressed using a set of parameters presented so as to allow equations of motion to be solved. The parameters may be left open (e.g. specifying a range of allowable parameters) or may be specified as a particular value. The former is referred to as an instance of parametric aircraft intent to distinguish it from the latter that is referred to as complete aircraft intent or just as aircraft intent. The theory of formal languages may be used to implement this formulation: an aircraft intent description language provides the set of instructions and the rules that govern the allowable combinations that express the aircraft intent, and so allow a prediction of the aircraft trajectory.

Co-pending U.S. patent application Ser. No. 12/679,275 published as US 2010-0305781 A1, also in the name of The Boeing Company, describes aircraft intent in more detail, and the disclosure of this application is incorporated herein in its entirety by reference. Co-pending U.S. patent application Ser. No. 13/360,318 published as US 2012-0290154 A1, also in the name of The Boeing Company, describes flight intent in more detail, and the disclosure of this application is incorporated herein in its entirety by reference.

SUMMARY

Against this background and according to a first aspect, the present disclosure resides in a computer-implemented method of generating a description of aircraft intent expressed in a formal language that provides an unambiguous description of an aircraft's intended motion and configuration during a period of flight. The period of flight may be all or part of a flight from takeoff to landing, and may also include taxiing on the ground.

The method comprises obtaining a description of flight intent corresponding to a flight plan spanning the period of flight. This flight intent may be generated by a pilot or automatically generated by flight management software in the aircraft.

The method further comprises ensuring that the flight intent description is parsed to provide instances of flight intent, each instance of flight intent spanning a flight segment with the flight segments together spanning the period of flight. Thus the flight intent descriptions contained in the flight intent are reviewed and used to define flight segments that correspond to the time intervals for which the flight intent description is active. Thus, the period of flight is divided into a series of flight segments with the boundaries between flight segments corresponding to a flight intent description becoming active or expiring. The descriptions of flight intent are generally referred to herein as instances of flight intent and the period of time for which they are active is generally referred to herein as their execution interval. Ensuring that the parsing has been done may correspond to checking that the received description of flight intent has been parsed in this way, or it may correspond to performing the parsing.

The method comprises converting the parsed flight intent into parametric aircraft intent by generating an associated flight segment description for each flight segment that comprises instances of flight intent to close all associated degrees of freedom of motion of the aircraft during the flight segment. Each instance of flight intent provides a description of the aircraft's motion in at least one degree of freedom of motion thereby closing the associated degrees of freedom of motion. Optionally, the method may also require one or more degrees of freedom of aircraft configuration to be closed.

At least some flight segment descriptions contain a parameter range. The method further comprises optimising the parametric aircraft intent by determining an optimal value for the parameter of each parameter range. Determining the optimal values may comprise generating initial parameter values thereby forming a model aircraft intent and calculating a trajectory from the model aircraft intent. Then, a merit function value for the trajectory may be calculated using a merit function. This may be followed by repeated iterations of amending the parameter values, calculating the resulting trajectory and calculating the resulting merit function value to determine whether the description of aircraft intent is improved, thereby optimising the parameter values by improving the merit function value.

Optionally, some flight segment descriptions contain one or more objectives that are relevant to the associated flight segment. These objectives may be used to form the merit function. The objectives may be added to the flight segment descriptions during the method. For example, flight segment descriptions may be compared with objectives stored in a database and objectives that are identified as being relevant to a flight segment description may be added to that flight segment description.

Objectives may correspond to user preferences and may be directed to safety and efficiency. The user may correspond to an airline or may correspond to a pilot. The objectives may be stored in a user preferences model that comprises information describing such operational preferences. Example user preferences are: operational revenue such as maximising payload weight, minimising fuel consumption, minimising over-flight fees, minimising landing fees, minimising maintenance costs; environmental impact such as minimising $CO_x$ and $NO_x$ emissions, minimising noise emissions; and quality of service such as increasing passengers' comfort (e.g. avoiding sudden and extreme manoeuvres) and reducing delays.

Identifying objectives that are relevant to the flight segment description may comprise identifying objectives associated with the aircraft. Identifying objectives that are relevant to the flight segment description may comprise identifying objectives associated with the aircraft by identifying objectives of the airline operating the aircraft, by identifying objectives pertaining to a phase of flight occurring during the corresponding flight segment, or by identifying objectives pertaining to airspace though which the aircraft will pass during the corresponding flight segment. This effectively filters objectives that are not relevant to the current flight segment. For example, objectives may be ignored where they do not relate to the type of the aircraft.

In general, a description of a set of initial conditions of the aircraft at the start of the period of flight will be needed. This description of the initial conditions may be part of the description of flight intent obtained. Alternatively, the method may further comprise obtaining a description of a set of initial conditions of the aircraft at the start of the period of flight and ensuring that the flight intent description and the initial conditions are parsed to provide the instances of flight intent.

As noted above, the instances of flight intent may include descriptions of aircraft configuration. The aircraft configuration may be grouped into degrees of freedom that require definition in the aircraft intent. For example, three degrees of freedom of configuration may be required, one degree defining the configuration of the landing gear, one degree defining the configuration of high lift devices such as flaps, and one degree defining the configuration of the speed brakes. Landing gear may be defined as either stowed or deployed, and the speed brakes may also be defined as stowed and deployed. High lift configurations may have many more states, for example corresponding to stowed and several extended positions.

Consequently, an aircraft may be defined by aircraft intent having six degrees of freedom, namely three degrees of freedom of motion, and three degrees of freedom of configuration corresponding to landing gear, high lift devices and speed brakes.

The three degrees of freedom of motion may comprise one degree corresponding to the lateral profile and two degrees corresponding to the vertical profile. To close the two degrees relating to the vertical profile, flight intent may be required that provides a description of two out of the following three aspects of aircraft motion: vertical path, speed and propulsion.

Objectives may relate to aircraft configuration. For example, a flight segment corresponding climb out after take off may have an objective to minimise fuel burn.

Any of the above methods may further comprise calculating a trajectory for the period of flight from the aircraft intent for use in a variety of applications. For example, the trajectory may be made available to a pilot for inspection. Alternatively, the aircraft may be made to fly the trajectory either manually by a pilot or automatically by an autopilot. The aircraft intent and trajectory may be used by air traffic control. For example, air traffic control may compare trajectories found in this way to identify conflicts between aircraft.

As will be appreciated from the above, computers and computer processors are suitable for implementing the present disclosure. The terms "computer" and "processor" are meant in their most general forms. For example, the computer may correspond to a personal computer, a mainframe computer, a network of individual computers, laptop computers, tablets, handheld computers like PDAs, or any other programmable device. Moreover, alternatives to computers and computer processors are possible. Programmed electronic components may be used, such as programmable logic controllers. Thus, the present disclosure may be implemented in hardware, software, firmware, and any combination of these three elements. Further, the present disclosure may be implemented in the computer infrastructure of an aircraft, or on a computer readable storage medium having recorded thereon a computer program comprising computer code instructions, when executed on a computer, cause the computer to perform one or more methods of the invention. All references above to computer and processor should be construed accordingly, and with a mind to the alternatives described herein.

Other aspects of the disclosure along with preferred features, are set out in the appended claims.

BRIEF DESCRIPTION OF THE DRAWINGS

In order that the present disclosure may be more readily understood, preferred embodiments will now be described, by way of example only, with reference to the accompanying drawings in which.

DETAILED DESCRIPTION

Figure 1:
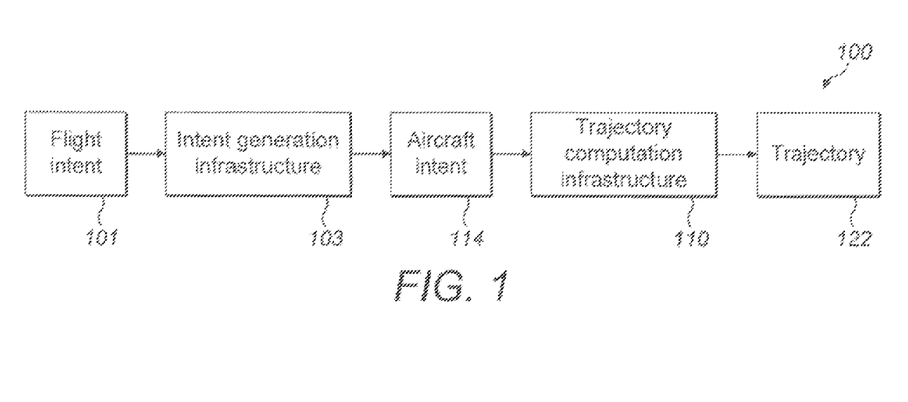
FIG. 1 shows a system for computing an aircraft's trajectory using flight intent and aircraft intent according to an embodiment of the invention.
Figure 2:
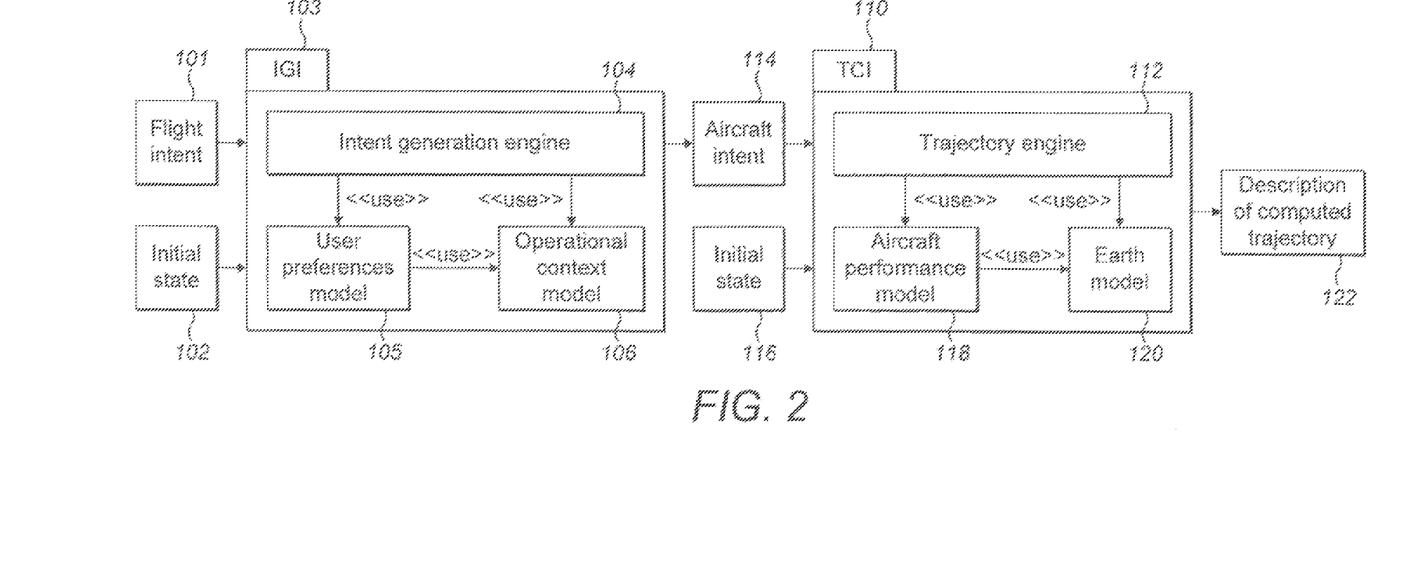
FIG. 2 shows the system of FIG. 1 in greater detail according to an embodiment of the invention.

A system for computing an aircraft's trajectory 100 from a description of aircraft intent that is in turn derived from flight intent is shown in FIGS. 1 and 2.

FIG. 1 shows a basic structure of how flight intent 101 may be used to derive aircraft intent 114, and how aircraft intent 114 may be used to derive a description of an aircraft's trajectory 122. In essence, flight intent 101 is provided as an input to an intent generation infrastructure 103. The intent generation infrastructure 103 determines aircraft intent 114 using the instructions provided by the flight intent 101 and other inputs to ensure a set of instructions is provided as aircraft intent 114 that will allow an unambiguous trajectory 122 to be calculated. This process may comprise intermediate steps of enriching the flight intent 101 and augmenting the enriched flight intent to provide parametric aircraft intent, before finally optimising the parametric aircraft intent to produce the aircraft intent 114.

The aircraft intent 114 output by the intent generation infrastructure 103 may then be used as an input to a trajectory computation infrastructure 110. The trajectory computation infrastructure 110 calculates an unambiguous trajectory 122 using the aircraft intent 114 and other inputs that are required to solve the equations of motion of the aircraft.

FIG. 2 shows the system of FIG. 1 in further detail. As can be seen, the intent generation infrastructure 103 receives a description of the flight intent 101 as an input along with a description of the initial state 102 of the aircraft (the initial state 102 of the aircraft may be defined as part of the flight intent 101, in which case these two inputs are effectively one and the same). The intent generation infrastructure 103 comprises an intent generation engine 104 and a pair of databases, one storing a user preferences model 105 and one storing an operational context model 106.

The user preferences model 105 embodies the preferred operational strategies governing the aircraft and may correspond to both constraints and objectives, e.g. the preferences of an airline with respect to loads (both payload and fuel); how to react to meteorological conditions such as temperature, wind speeds, altitude, jet stream, thunderstorms and turbulence as this will affect the horizontal and vertical path of the aircraft as well as its speed profile; cost structure such as minimising time of flight or cost of flight, maintenance costs, environmental impact; communication capabilities; and security considerations. The user preferences model 105 may be used when converting the flight intent input 101 to the aircraft intent output 114—in any of the steps of enriching the flight intent 101, augmenting the enriched flight intent to provide parametric aircraft intent, completing the aircraft intent—by providing further detail, as will be described in more detail below.

The operational context model 106 embodies constraints on use of airspace. For example, the operational context model 106 may contain details of restricted airspace and of standard terminal arrival routes (STARS) and standard instrument departures (SIDS) to be followed into and out from an airport. The operational context model 106 is also used when converting the flight intent input 101 to the aircraft intent output 114—in any of the steps of enriching the flight intent 101, augmenting the enriched flight intent to provide parametric aircraft intent, completing the aircraft intent—by providing further detail, as will be described in more detail below.

The intent generation engine 104 uses the flight intent 101, initial state 102, user preferences model 105 and operational context model 106 to provide the aircraft intent 114 as its output.

FIG. 2 shows that the trajectory computation infrastructure 110 comprises a trajectory engine 112. The trajectory engine 112 requires as inputs both the aircraft intent 114 described above and also the initial state 116 of the aircraft. The initial state 116 of the aircraft may be defined as part of the aircraft intent 114 in which case these two inputs are effectively one and the same. For the trajectory engine 112 to provide a description of the computed trajectory 122 for the aircraft, the trajectory engine 112 uses two models: an aircraft performance model 118 and an Earth model 120.

The aircraft performance model 118 provides the values of the aircraft performance aspects required by the trajectory engine 112 to integrate the equations of motion. These values depend on the aircraft type for which the trajectory is being computed, the aircraft's current motion state (position, velocity, weight, etc) and the current local atmospheric conditions.

In addition, the performance values may depend on the intended operation of the aircraft, i.e. on the aircraft intent 114. For example, a trajectory engine 112 may use the aircraft performance model 118 to provide a value of the instantaneous rate of descent corresponding to a certain aircraft weight, atmospheric conditions (pressure altitude and temperature) and intended speed schedule (e.g. constant calibrated airspeed). The trajectory engine 112 will also request from the aircraft performance model 118 the values of the applicable limitations so as to ensure that the aircraft motion remains within the flight envelope. The aircraft performance model 118 is also responsible for providing the trajectory engine 112 with other performance-related aspects that are intrinsic to the aircraft, such as flap and landing gear deployment times.

The Earth model 120 provides information relating to environmental conditions, such as the state of the atmosphere, weather conditions, gravity and magnetic variation.

The trajectory engine 112 uses the inputs 114 and 116, the aircraft performance model 118 and the Earth model 120 to solve a set of equations of motion. Many different sets of equations of motion are available that vary in complexity, and that may reduce the aircraft's motion to fewer degrees of freedom by means of a certain set of simplifying assumptions. For example, equations of motion describing aircraft motion in six degrees of freedom of motion may be used. A simplified set of equations of motion may use only three degrees of freedom of motion.

The trajectory computation infrastructure 110 may be air-based or land-based. For example, the trajectory computation infrastructure 110 may be associated with an aircraft's flight management system that controls the aircraft on the basis of a predicted trajectory that captures the airline operating preferences and business objectives. The primary role for land-based trajectory computation infrastructures 120 is for air traffic management.

Using a standardised approach to describing an aircraft's trajectory allows greater interoperability between airspace users and managers. It also allows greater compatibility between many of the legacy software packages that currently predict trajectories, even if interpreters are required to convert information from the standard format into a proprietary format.

Moreover, a standardised approach also works to the benefit of flight intent 101 and aircraft intent 114. For example, flight intent 101 may be expressed using the instructions and other structures of the formal language implementation used to express aircraft intent 114. In addition, flight intent 114 provides a user with an extension to the aircraft intent language that allows flight intent 114 to be formulated where only certain aspects of aircraft's motion are known. By using a common expression format, these instances of flight intent may be easily augmented to form instances of aircraft intent.

As flight intent 101 may be thought of as a broader and generalised form of aircraft intent 114, it is useful to start with a consideration of aircraft intent 114 such that key concepts also used in generating flight intent 114 may be introduced.

Aircraft Intent

The aircraft intent description is an expression of a set of instructions in a formal language, an aircraft intent description language, which defines unambiguously the trajectory 122 of the aircraft. This expression is used by the trajectory computation engine 112 to solve the equations of motion that govern the aircraft's motion. To solve the equations, the configuration of the aircraft must be specified also. For example, configuration information may be required to resolve the settings of the landing gear, speed brakes and high lift devices. Hence, the aircraft intent 114 comprises a set of instructions including both configuration instructions that describe completely the aerodynamic configuration of the aircraft and motion instructions that describe unambiguously how the aircraft is to be flown and hence the resulting motion of the aircraft. As the motion instructions and the configuration instructions are both required to define uniquely the aircraft's motion, they are together referred to herein as the defining the degrees of freedom: motion instructions relate to the degrees of freedom of motion and configuration instructions relate to the degrees of freedom of configuration. For example, six degrees of freedom may be used to describe the aircraft such as lateral path (motion), vertical path (motion), speed (motion), landing gear (configuration), high lift devices (configuration) and speed brakes (configuration).

There exist in the art many different sets of equations of motion that may be used to describe an aircraft's motion. The sets of equations generally differ due to their complexity. In principle, any of these sets of equations may be used with the present disclosure. The actual form of the equations of motion may influence how the aircraft intent description language is formulated because variables that appear in the equations of motion also appear in the instructions defining the aircraft intent 114. However, the flight intent 101 is not constrained in this way in that it may express flight intent 114 generally. Any detail specific to the particular equations of motion to be used need not be specified in the flight intent 101, and may be added when forming the aircraft intent 114.

The aircraft intent description language is a formal language whose primitives are the instructions. The grammar of the formal language provides the framework that allows individual instructions to be combined into composites and then into sentences that describe flight segments. Each flight segment contains a complete set of instructions that close the degrees of freedom of motion and so unambiguously defines the aircraft trajectory 122 over its associated flight segment.

Instructions may be thought of as indivisible pieces of information that capture basic commands, guidance modes and control inputs at the disposal of the pilot and/or the flight management system. Each instruction may be characterised by three main features: effect, meaning and execution interval. The effect is defined by a mathematical description of its influence on the aircraft's motion. The meaning is given by its intrinsic purpose and is related to the operational purpose of the command, guidance mode or control input captured by the instruction. The execution interval is the period during which the instruction is affecting the aircraft's motion. The execution of compatible instructions may overlap, while incompatible instructions cannot have overlapping execution intervals (e.g. instructions that cause a conflicting requirement for the aircraft to ascend and descend would be incompatible).

Lexical rules capture all the possible ways of combining instructions into aircraft intent 114 such that overlapping incompatible instructions are avoided and so that the aircraft trajectory is unambiguously defined.

Flight Intent

The definition of a specific aircraft trajectory is the result of a compromise between a given set of objectives to be met and a given set of constraints to be followed. These constraints and objectives are included as part of the flight intent 101 that could be considered as a flight blueprint. Importantly, flight intent 101 does not have to determine the aircraft motion unambiguously: in principle, there may be many trajectories that fulfil the set of objectives and constraints encompassed by a given flight intent 101. An instance of flight intent 101 will generally give rise to a family of aircraft intents 114, each instance of aircraft intent 114 resulting in a different unambiguous trajectory. For example, flight intent may define a lateral path to be followed but may not specify a vertical path to be followed over the same execution interval: many aircraft intents could be generated from this flight intent, each aircraft intent corresponding to a different vertical profile.

Thus, flight intent 101 must normally be supplemented with enough information to allow a unique aircraft intent 114 to be determined and thus a unique trajectory. Adding to the flight intent 101 to complete an aircraft intent 114 is the responsibility of the intent generation engine 104, whereas the trajectory engine 112 assumes responsibility for determining the corresponding trajectory 122 from the aircraft intent 114.

As explained above, each instance of flight intent 101 contains trajectory-related information that does not necessarily univocally determine the aircraft motion, but instead usually incorporates a set of high-level conditions that define certain aspects that the aircraft should respect during its motion (e.g. following a certain route, keeping a fixed speed in a certain area). The flight intent 101 is augmented to capture key operational objectives and constraints that must be fulfilled by the trajectory (e.g. intended route, operator preferences, standard operational procedures, air traffic management constraints, etc.) by reference to the user preferences model 105 and the operational context model 106.

Considering the information that is used directly to generate and augment the flight intent 101, it is possible to group similar elements into three separate structures: flight segments, operational context and user preferences.

The flight segments combine to form the flight path to be followed by the aircraft during the flight, i.e. the four-dimensional trajectory is made up of a series of successive flight segments. As explained above with respect to the operational context model 106, the operational context may include the set of air traffic management constraints that may limit the trajectory followed by an aircraft in one or more dimensions. They may include altitude constraints, speed constraints, climb/descend constraints, heading/vectoring/route constraints, standard procedures constraints, route structures constraints, SID constraints, STAR constraints, and coordination and transfer constraints (e.g. speed and altitude ranges and the location of entrance and exit points which should be respected by any flight when it is moving from one sector to the next). These constraints may be retrieved from the operational context model 106 and used to enrich the flight intent 101.

As explained above with respect to the user preferences model 105, user preferences are usually directed to safety and efficiency, and generally differ from one user (such as an airline or pilot) to another. The most common user preferences relate to: increasing operational revenue such as maximising payload weight to be flown, minimising fuel consumption, minimising over-flight fees, minimising landing fees, and minimising maintenance costs; environmental impact such as minimising COx and NOx emissions, minimising noise emissions; and quality of service such as increasing passengers' comfort (e.g. avoiding sudden and extreme manoeuvres, avoiding turbulence) and reducing delays. These preferences may correspond to constraints or objectives. These constraints and objectives may be retrieved from the user preferences context model 105 and used to enrich the flight intent 101.

Flight Intent Description Language (FIDL)

It is proposed to represent flight intent using a formal language, composed of a non-empty finite set of symbols or letters, known as an alphabet, which are used to generate a set of strings or words. A grammar is also required, namely a set of rules governing the allowable concatenation of the alphabet into strings and the strings into sentences.

Figure 3:
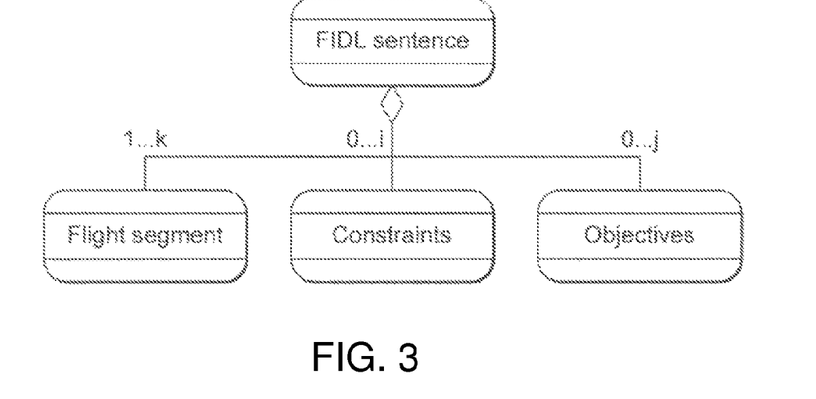
FIG. 3 shows elements of the flight intent description language according to an embodiment of the invention.

The alphabet comprises three types of letters, as shown in FIG. 3: flight segment descriptions, constraints and objectives. A sentence is formed by the proper combination of these elements following grammatical rules that will be described below. A sentence is an ordered sequence of flight segment descriptions, i.e. ordered according to when they occur, in which different constraints and objectives are active to influence the aircraft motion.

Flight segment descriptions, within the alphabet, represent the intent of changing the aircraft motion state from one state into another (e.g. a translation from one 3D point to another 3D point, a turning between two courses, an acceleration between two speeds or an altitude change). A flight segment may be characterised in its flight segment description by two aircraft motion states identified by a condition or event that establishes certain requirements for the trajectory to be flown between these states. These conditions represent the execution interval of the flight segment. The conditions may close one or more degrees of freedom during the flight segment, including both degrees of freedom of motion and of configuration.

Constraints represent restrictions on the trajectory, as described above, and the constraints may be achieved by making use of the open degrees of freedom that are available during the applicable flight segment(s).

Objectives, as described above, represent a desire relating to the trajectory to maximize or minimize a certain functional (e.g. cruise to minimise cost). The objectives may be achieved by making use of the open degrees of freedom that are available during the applicable flight segment(s), excluding those that are used to respect the constraints affecting that flight segment(s).

Combining these three elements it is possible to build words as valid FIDL strings. For example, the flight intent information "fly from waypoint RUSIK to waypoint FTV" can be expressed by an FIDL word containing a flight segment description whose initial state is defined by the coordinates of waypoint RUSIK and whose final state is defined by the coordinates of waypoint FTV. This flight intent description could be enriched by a constraint such as "maintain flight level above 300 (FL300)". In the same way, it would be possible to add information to this FIDL word regarding some objectives over the trajectory such as maximise speed. To ensure that any constraint or objective is compatible with a flight segment description, the affected aspect of aircraft motion or configuration, expressed as a degree of freedom, should not have been previously closed. In the previous example, the flight level constraint is compatible with the flight segment description because the flight segment description does not define any vertical behaviour. Often constraints and objectives will extend over a sequence of flight segments and so are added to multiple flight segment descriptions.

The attributes of a flight segment description are effect, execution interval and a flight segment code. The effect provides information about the aircraft behaviour during the flight segment, and could range from no information to a complete description of how the aircraft is flown during that flight segment. The effect is characterised by a composite which is an aggregated element formed by groups of aircraft intent description language (AIDL) instructions or is a combination of other composites, but need not meet the requirement for all degrees of freedom to be closed.

Figure 4:
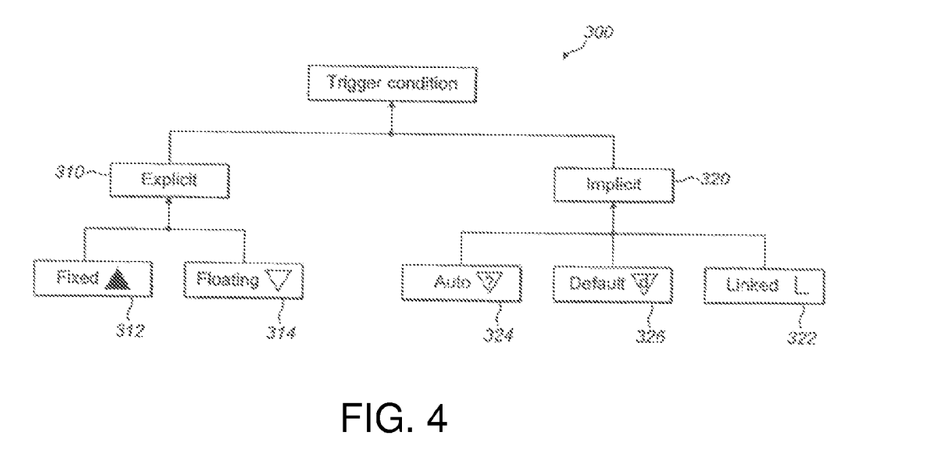
FIG. 4 is a diagram showing the different types of trigger conditions according to an embodiment of the invention.

The execution interval defines the interval during which the flight segment description is active, fixed by means of the begin and end triggers. The begin and end triggers may take different forms, as indicated in FIG. 4. Explicit triggers 310 are divided into fixed 312 and floating 314 triggers. Fixed triggers 312 correspond to a specified time instant for starting or ending an execution interval such as to set an airspeed at a fixed time. Floating triggers 314 depend upon an aircraft state variable reaching a certain value to cause an execution interval to start or end, such as keep airspeed below 250 knots until altitude exceeds 10,000 feet. Implicit triggers 320 are divided into linked 322, auto 324 and default 326 triggers. A linked trigger 322 is specified by reference to another flight segment, for example by starting when triggered by the end trigger of a previous flight segment. Auto triggers delegate responsibility for determining whether the conditions have been met to the trajectory computation engine 112, for example when conditions are not known at the intent generation time, and will only become apparent at the trajectory computation time. Default triggers represent conditions that are not known at intent generation, but are determined at trajectory computation because they rely upon reference to the aircraft performance model.

Constraints could be self-imposed by the aircraft operator such as avoid over-flight fees (in which case information relating to the constraints are stored in the user preferences model 105), or by the operational context or by air traffic management such as follow a STAR flight path (in which case information relating to the constraints are stored in the operational context model 106). In any case, the final effect over the aircraft motion will be a limitation on the possible aircraft behaviour during a certain interval. Constraints may be classified according to the degree(s) of freedom affected by the constraint which is useful when determining whether it can be applied to a flight segment description (i.e. when determining whether that degree of freedom is open and so available).

Objectives are defined as a functional that can be combined into a merit function whose optimisation drives the process of finding the most appropriate trajectory. The functional may define explicitly the variable or variables used for the optimisation (e.g. altitude, climb rate, turn radius), and may return the value for them that minimises or maximises the functional. The variables of control are related to the degrees of freedom used to achieve the functional. Therefore, they specify the intention of using one or more degrees of freedom to achieve the optimisation. When no variable of control is defined, the aircraft intent generation process will use any remaining open degree of freedom to achieve the optimisation. Objectives may be classified considering the degree of freedom that can be affected by the objective effect.

The FIDL grammar is divided in lexical and syntactical rules. The former contains a set of rules that governs the creation of valid words using flight segment descriptions, constraints and objectives. The latter contains a set of rules for the generation of valid FIDL sentences.

The lexical rules consider the flight segment descriptions as the FIDL lexemes, i.e. the minimal and indivisible element that is meaningful by itself. Constraints and objectives are considered as FIDL prefixes (or suffixes) which complement and enhance the meaning of the lexemes but do not have any sense individually. Therefore the lexical rules describe how to combine the lexemes with the prefixes in order to ensure the generation of a valid FIDL string. They also determine whether a string formed by lexemes and prefixes is valid in the FIDL.

The lexical rules are based on the open and closed degrees of freedom that characterise a flight segment. If the flight segment has no open degree of freedom, it means that the associated lexemes are totally meaningful and their meaning cannot be complemented by any prefix (constraint or objective). For lexemes whose flight segments have one or more open degrees of freedom, as many prefixes as open degrees of freedom may be added.

The FIDL syntactical rules are used to identify if a sentence formed by FIDL words is valid or not. A well-formed FIDL sentence is defined by a sequence of concatenated flight segment descriptions, enriched with constraints and objectives, that represent a chronological succession of aircraft motion states during a period of flight.

Generation of Aircraft Intent

A method of generating aircraft intent according to an embodiment of the present disclosure will now be described with reference to FIG. 5.

As step 510, the intent generation infrastructure 103 is initialised to create a flight intent instance to be used in a specific operational context, for a specific user and for a specific aircraft model.

At step 520, the flight intent 101 and initial conditions 102 are received by the intent generation infrastructure 103, and are parsed to create flight segments and corresponding flight intent objects to span each flight segment. Each flight object will contain a flight segment description. In some embodiments, the parsed flight intent will contain flight objects already augmented by constraints or objectives, for example as already provided by an operator when defining the original flight intent 101 as part of a mission plan or the like.

The parsed flight intent is provided to the intent generation engine 104 so that it may be converted to aircraft intent 114. The intent generation engine 104 has at its disposal a set of strategies and heuristics to allow it to convert the flight intent 101 into aircraft intent 114 by adding information to the parsed flight intent objects to close all degrees of freedom. This process comprises steps 530 to 560 shown in summary in FIG. 5, and as shown in more detail in FIGS. 6 and 7.

At step 530, the intent generation engine 104 passes the flight intent objects to the user preferences model 105 and operational context model 106 so that the flight intent 101 may be enriched. The intent generation engine 104 identifies constraints and objectives from the models 105 and 106 that are relevant to each flight intent object (e.g. not all the constraints included in the operational context are likely to apply to a specific route or to all flight segments on a particular flight path). How relevant constraints and objectives are identified is described in more detail below. The intent generation engine 104 enriches the flight intent 101 by expanding the flight intent objects to add the relevant constraints and objectives to the associated flight segment descriptions according to the syntactical and lexical rules imposed by the flight intent description language. The output of step 530 is an enriched flight intent.

At step 540, the intent generation engine 104 identifies flight intent objects of the enriched flight intent having open degrees of freedom. The intent generation engine 104 fills these flight intent objects with composites to close all degrees of freedom. This process is driven by several completion strategies based on the sequence and type of any constraints included in the enriched flight intent object. In general, constraints will not cause a particular parameter to be uniquely specified, but instead usually set a range of parameters. For example, a constraint added to a flight intent object may specify a maximum airspeed to be flown leaving open a range of airspeed parameters.

As step 550, the intent generation engine 104 optimises the parametric aircraft intent. This optimisation process takes all the parameter ranges specified in the parametric aircraft intent, and calculates optimal values for each parameter by optimising an overall merit function that is calculated from all the objectives present in the enriched flight intent. The parametric ranges specified in each flight intent object are then replaced by the optimal values.

At the end of the optimisation step 550, the method proceeds to step 560 where the intent generation engine 104 checks that the predicted trajectory for the aircraft intent fulfils all constraints defined by the operational context model 106, user preferences model 105 and the flight intent 101.

If all constraints are fulfilled, the method ends at step 570 where completed aircraft intent 114 is provided and/or a description of the corresponding trajectory 122 is provided. If any constraints are found not to be fulfilled, the method returns to step 540 where the original set of enriched flight intent provided at step 530 is retrieved and the intent generation engine 104 uses an alternative strategy to complete the flight intent by inserting composites. The method then continues as before through steps 540, 550 and 560. A number of iterations of the loop may be performed in an attempt to find a solution. For example, strategies may be ranked such that the intent generation engine 104 selects strategies in turn according to rank until an aircraft intent 114 is formed that is found to meet all constraints at step 560. Self-checking is performed such that the intent generation engine 104 will return an exception declaring the impossibility of generating an aircraft intent based on the initial flight intent 101 in the defined operational context. The declaration of an exception may be triggered after a set number of iterations or after a pre-defined time delay.

Flight Intent Enrichment

Figure 5:
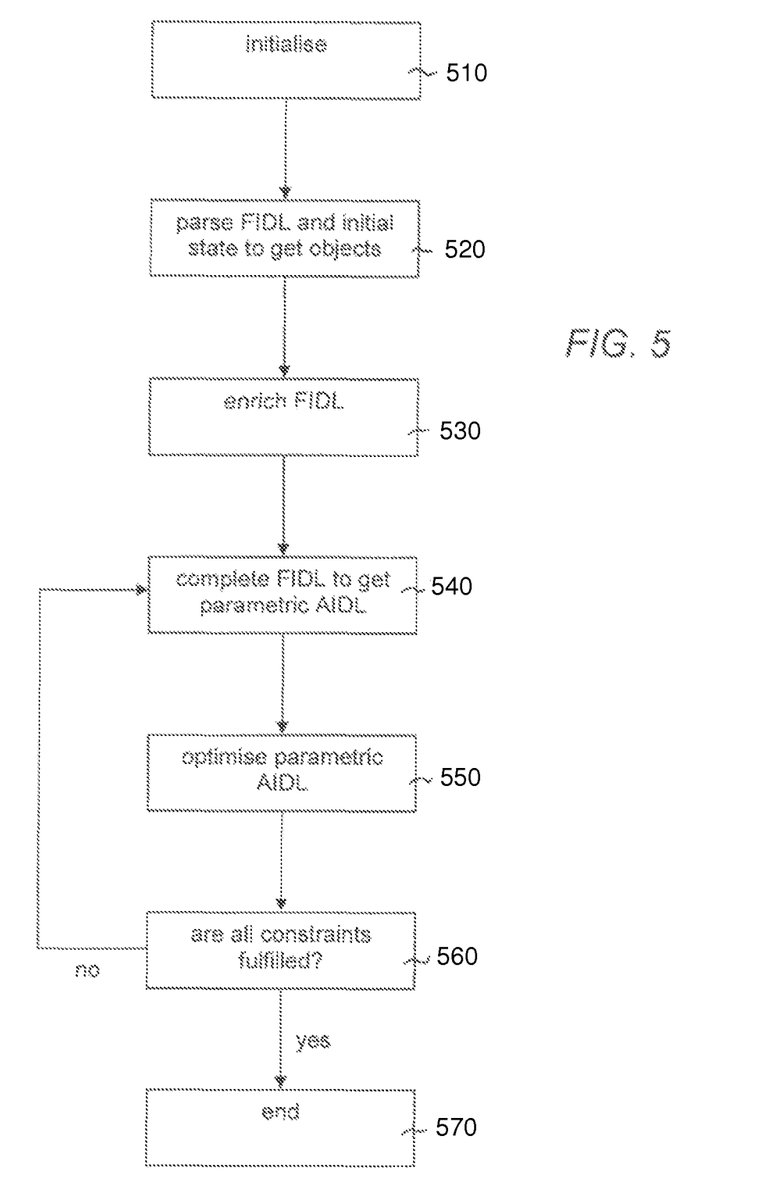
FIG. 5 is a method of deriving aircraft intent according to an embodiment of the invention.

At step 530 in FIG. 5, the intent generation engine 104 enriches the flight intent objects with constraints and objectives retrieved from the user preferences model 105 and/or the operational context model 106. To do this, the intent generation engine 104 identifies constraints and objectives from the models 105 and 106 that are relevant to each flight intent object (e.g. not all the constraints included in the operational context are likely to apply to a specific route or to all flight segments on a particular flight path).

Relevance of constraints and objectives to flight intent objects may be determined using descriptions associated with the data stored in the user preferences model 105 and the operational context model 106. For example, data may be identified by the geographical region to which it applies and/or by the phase of flight to which it applies. For example, the operational context model 106 may contain a topographical description of several regions within an airspace. Each region may have a description of hazards to be avoided such as mountains and densely populated areas. A flight intent object that will apply within that region may be augmented with the associated constraints for that region. As a further example, the operational context model 106 may contain descriptions of STARs to be followed when arriving at an airport. The flight intent 101 may indicate a preferred arrival waypoint into the terminal area, and so only the STAR description relating to that arrival point would be relevant, and so its constraints may be added to the flight intent objects of the corresponding flight segments.

Turning to the user preferences model 105, this may contain an airline's preferences relating to different phases of flight or to different aircraft types. For example, it might define that during take off and climb out, the aircraft is flown to minimise fuel consumption. Alternatively, the user preferences model 105 might define that during descent, the aircraft is maintained at the maximum altitude possible for as long as possible. It will be appreciated that flight segments relating to the descent phase of a flight may then have an associated objective to maintain maximum altitude.

The intent generation engine 104 enriches the flight intent 101 by expanding the flight intent objects to add relevant constraints and objectives to the associated flight segment descriptions according to the syntactical and lexical rules imposed by the flight intent description language. The output of step 530 is an enriched flight intent that has flight intent objects comprising flight segment descriptions that may or may not be enriched with constraints and objectives.

Generating a Parametric Aircraft Intent

At step 540, the intent generation engine 104 closes any open degrees of freedom within flight intent objects. Thus, the enriched flight intent that may still contain open degrees of freedom is completed to ensure all degrees of freedom of motion and configuration are closed for all flight intent objects. At this stage, parametric ranges may be used to close degrees of freedom, such that parametric aircraft intent is formed. This contains information on all degrees of freedom, but does not contain specific values for parameters such that the parametric aircraft intent does not define a unique trajectory.

Figure 6:
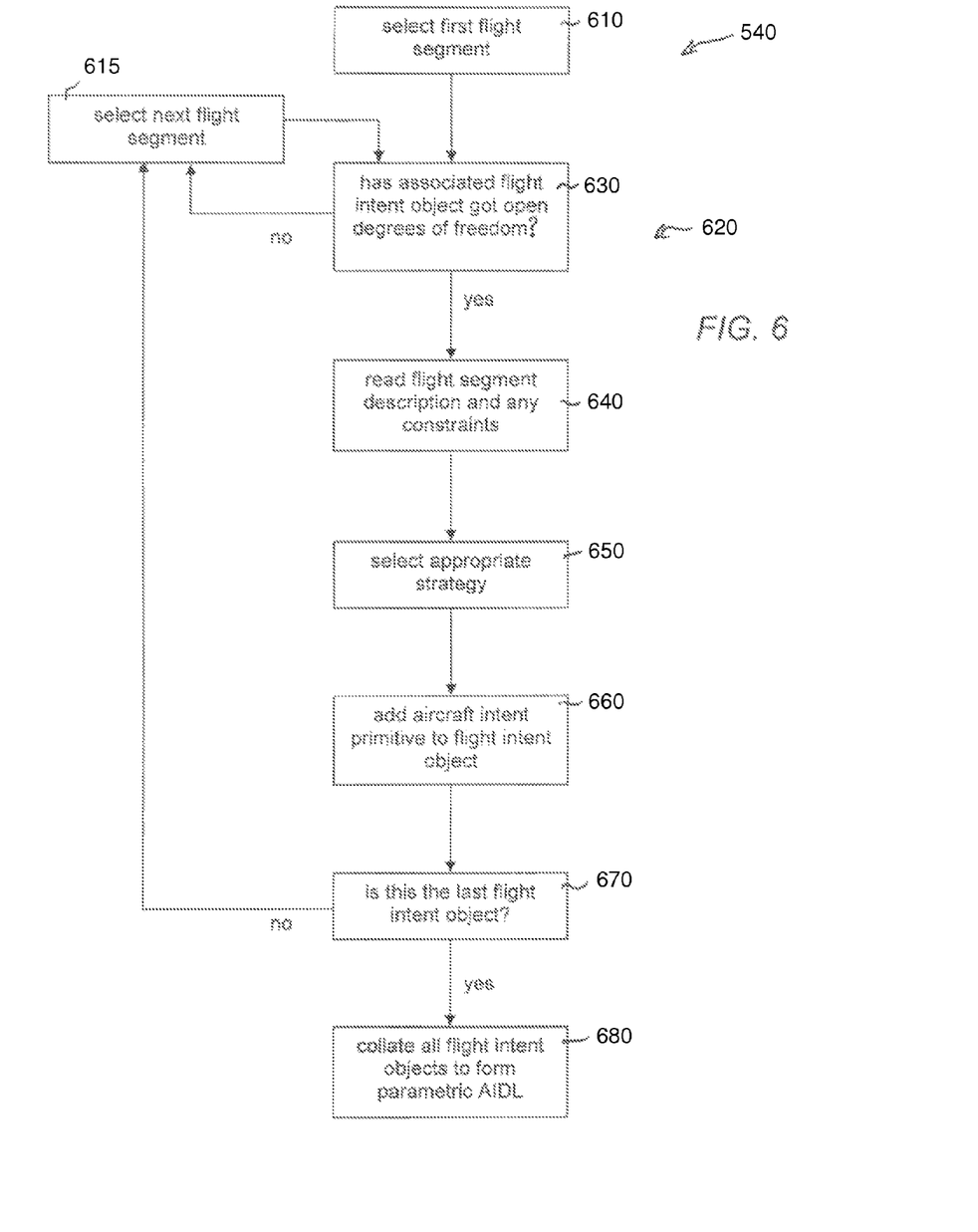
FIG. 6 shows how flight intent may be completed to form parametric aircraft intent according to an embodiment of the invention.

FIG. 6 shows how the enriched flight intent may be completed to form a parametric aircraft intent. The process starts at 610 where the first flight segment is selected. The flight segments may be ordered in any way, although ordering the flight segments chronologically is the obvious example. The ordering merely needs to provide a list of flight segments that may be processed sequentially.

After the first flight segment has been selected at 610, the process continues to a routine indicated at 620 in FIG. 6. The routine 620 is repeated for each flight segment in turn, as will be now be described.

At step 630, the selected flight segment is checked to see whether it has any open degrees of freedom. If not, the method continues to step 615 where the next flight segment is selected and the process enters routine 620 once more. If one or more open degrees of freedom are found at step 630, that flight segment continues through procedure 620 for further processing.

Next, at step 640, the flight segment description and any constraints pertaining to the current flight segment are retrieved. This data is used at step 650 to select an appropriate strategy for completing the open degrees of freedom. This may be done by looking at which degree or degrees of freedom must be closed. For example, the open degrees may relate to the vertical flight profile or may relate to landing gear configuration. The intent generation engine 104 has at its disposal strategies corresponding to templates for closing particular degrees of freedom. These strategies are tagged to identify to which degrees of freedom they relate. Composites may also be stored and associated with a strategy, ready for selection by the intent generation engine 104 and insertion into the flight segment description.

The following are examples of strategies and associates composites: geometric paths providing different lateral path composites to define different path shapes (e.g. right turn, left turn, sequence of turns), level flight, constant path angle ascend/descend, constant speed ascend/descend, general ascend/descend, CAS-MACH climb, MACH-CAS descend, level trust acceleration/deceleration, clean configuration (e.g. of landing gear, high lift devices and speed brakes), and scheduled configuration settings (e.g. landing gear deployed and high lift device extension for landing).

The strategies may also be tagged to indicate to which phase of flight they apply (e.g. take off, climb out, cruise, descent, final approach, landing, taxiing). The constraints are also used in determining which strategy should be selected. Returning to the example above, a constraint may specify a region of restricted airspace that is nearby, thus guiding the strategy chosen to ensure that the turn is made at an appropriate point to avoid the restricted airspace.

Heuristics may also be used when selecting a strategy. For example, a flight segment may not close the vertical profile.

The intent generation engine 104 may revert back to the earlier flight segments to find the last altitude specified and may then scan ahead to find the next flight segment that specifies an altitude. Comparison of the two altitudes may then guide selection of a suitable strategy. For example, if two flight segments specify the same altitude, intervening flight segments that do not specify an altitude may be amended using a strategy that maintains level flight.

Once a suitable strategy has been selected at step 650, the procedure 620 continues to step 660 where an aircraft intent primitive corresponding to the selected strategy is generated and added to the flight segment description of the flight intent object being processed. The primitive may be added as part of a composite where two or more primitives are to be combined, i.e. a strategy may require a primitive or a composite of primitives to describe the required instructions depending upon the complexity of the strategy.

Steps 650 and 660 are performed as necessary to ensure all open degrees of freedom are closed. With this processing finished, at step 670 a check is made to see whether the flight segment being processed is the final flight segment. If not, the process loops back to step 615 where the next flight segment is selected and procedure 620 is entered once more.

When all flight segments have been processed, as determined at step 670, the process continues to step 680 where all the completed flight objects are collated to form the parametric aircraft intent, expressed using a formal language (the aircraft intent description language). This completes step 540 of FIG. 5. The parametric aircraft intent is then processed according to step 550 where the parametric ranges are resolved into specific parameter values through an optimisation process that will now be described with respect to FIG. 7.

Optimising the Parametric Aircraft Intent

The optimisation process of step 550 takes all the parameter ranges specified in the parametric aircraft intent and calculates optimal values for each parameter by optimising an overall merit function that reflects the objectives defined in the flight intent objects.

Figure 7:
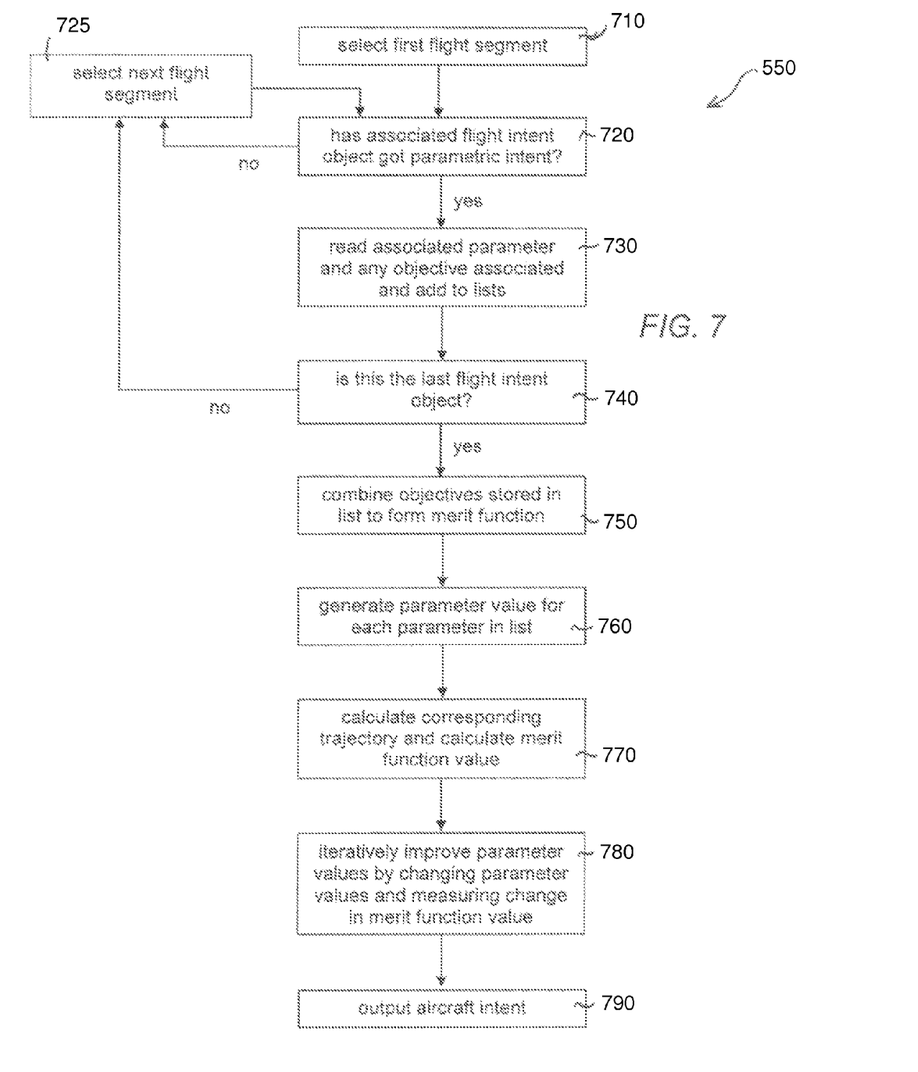
FIG. 7 shows how parametric aircraft intent may be optimised to provide a complete aircraft intent according to an embodiment of the invention.

As shown in FIG. 7, the process starts at step 710 where the first flight segment is selected. As described above, the flight segments may be ordered in any way that provides a list of flight segments for processing sequentially.

At step 720, the fight segment is reviewed to determine whether it contains any parameter ranges than need resolving. If not, the method proceeds to step 725 where the next flight segment is selected for processing. When a flight segment is found at step 710 to define one or more parameter ranges, that parameter range and any associated objectives are retrieved and stored in respective lists, as shown at step 730. Then, at step 740, a check is made to see if the flight segment being processed currently is the final flight segment. If not, the process loops back to step 725 so that the next flight segment may be selected for processing at step 720 once more. In this way, all flight segments are checked for parameter ranges, and lists are compiled that collate the parameter ranges to be resolved along with associated objectives.

At step 750, the objectives stored in the associated list are mathematically combined into a merit function that reflects all the objectives. The objectives may be stored in the user preferences model 105 as a mathematical function expressing the objective to be targeted. Then, forming the merit function may correspond to combining the individual mathematical functions describing each objective. The mathematical functions may be combined in any straightforward manner. For example, a weighted combination may be formed, where weights are assigned to each objective according to its importance. Data may be stored in the user preferences model 105 to indicate the relative importance of the objectives.

If a parameter range is found that does not have an associated objective, a library of pre-defined mathematical functions may be used to provide a mathematical function for inclusion in the merit function. For example, a mathematical function may be associated with the parameter range that assigns a constant value irrespective of the parameter value chosen, such that the parameter value may be chosen as any within the parameter range, but optimised to lead to an overall improvement of the merit function value. For example, selection of a particular value for the parameter may contribute to achieving an objective relating to the preceding flight segment.

Consequently, the merit function rewards how well the objectives are met and penalises how badly the objectives are not met.

At step 760, each parameter range in the associated list is read, and the associated flight intent object that appears in the parametric aircraft intent is amended such that the parameter range is replaced by a value falling within the range. Different schemes may be used to select a value, for example by selecting the maximum value, the minimum value, the mean value or by randomly generating a value. At the end of step 760, an aircraft intent results that has all parameters defined and with no parameter ranges remaining. This model aircraft intent is then tested by using the trajectory engine 112 to calculate the corresponding trajectory, from which the intent generation engine 104 can calculate the merit function value for the model aircraft intent.

The process then proceeds to step 780 where the model aircraft intent is optimised. This optimisation process improves the parameter values iteratively. That is, intent generation engine 104 goes through iterations of randomly changing some or all the parameter values, then calling the trajectory engine 112 to compute the new trajectory, and computing the new merit function value and determining whether it has been improved. In this way, the parameter values are evolved in a way that optimises the merit function. This may be done using any well known technique, such as using evolutionary algorithms like genetic algorithms or through linear optimisation. These techniques provide an optimised complete aircraft intent, and this is provided as an output at step 790.

Example of Approach to Airport

Figures 8, 9:
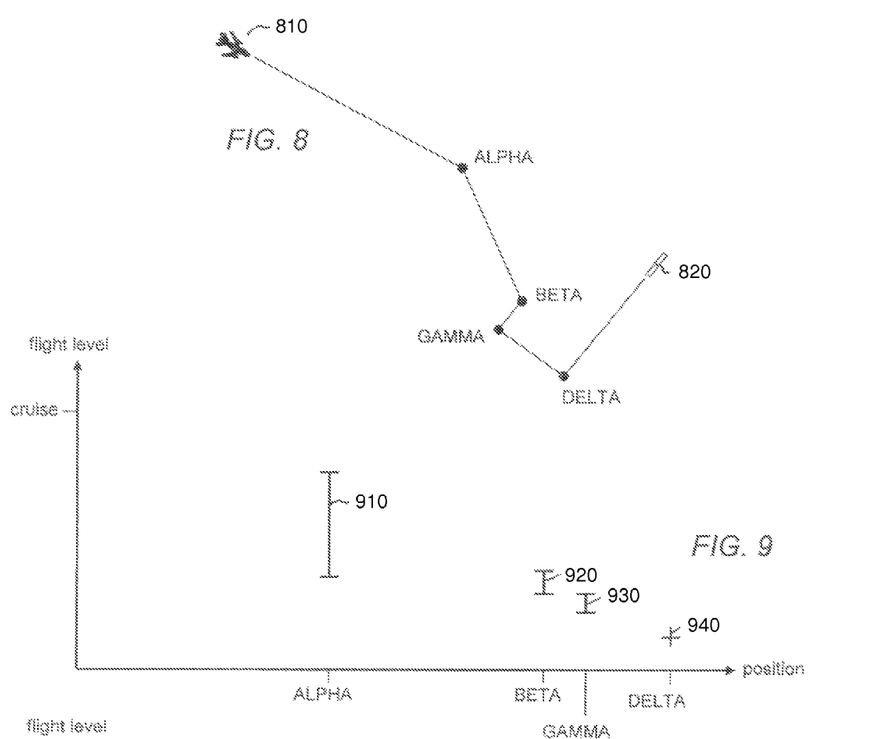
FIG. 8 shows a lateral flight profile to be followed when approaching an airport.
FIG. 9 shows vertical flight profile restrictions that apply to the approach shown in FIG. 8.

An example of the above methods will now be described with reference to FIGS. 8 to 10. In this example, an aircraft 810 is approaching an airport to land on a runway 820. The flight intent may merely specify that the aircraft is to land on runway 820 after arrival at waypoint ALPHA.

In order to provide a complete aircraft intent, the intent generation engine 104 may augment this basic flight intent with information retrieved from the operational context model 106 describing a STAR procedure to be followed when approaching the airport. For example, intent generation engine 104 may establish the wind direction, determine the direction for a headwind approach to the runway 820, and retrieve the STAR procedure for such a landing for aircraft arriving at waypoint ALPHA.

The STAR procedure will correspond to a set of restrictions. In this example, the lateral path to be followed routes the aircraft through waypoints ALPHA, BETA, GAMMA and DELTA, ready for a final straight approach to runway 820. These waypoints are shown in FIG. 9. The STAR procedure may also contain restrictions on speeds along the route as well as altitudes to be maintained at each waypoint. These altitudes are shown in FIG. 10.

At waypoint ALPHA, a broad permissible altitude range is defined, as indicated at 910. Smaller altitude ranges are defined for waypoints BETA and GAMMA, as shown at 920 and 930 respectively. A specific altitude is defined for waypoint DELTA as shown at 940, corresponding to a starting altitude for final approach from which a glide slope may be intercepted.

The intent generation engine 104 may use these restrictions to augment the flight intent. For example, additional flight segments may be created corresponding to the segments between the waypoints to be followed. Moreover, parametric intent may be created where the altitude ranges at each waypoint are defined without a specific altitude being provided. Objectives may be used to specify altitudes to be met, as follows.

Figure 10:
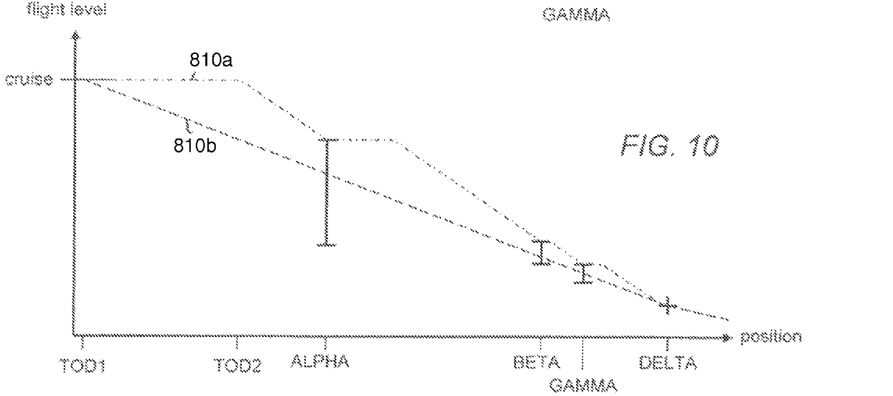
FIG. 10 shows two vertical flight profiles that meet the restrictions shown in FIG. 9.

FIG. 10 shows two alternative vertical profiles, 810a and 810b. Profile 810a corresponds to aircraft 810 being operated by an airline that prefers to fly as high as possible for as long as possible. This objective will be recorded in the user preferences model 105. Accordingly, the intent generation engine 104 sets altitudes at each waypoint as the maximum specified, then calculates the maximum rate of descent possible for the aircraft 810 to establish when each descent phase must begin, and creates segments that define level flight between each descent phase, along with defining the top of descent point (TOD2). Thus, by using the objective, intent generation engine 104 generates aircraft intent that will produce the stepped-down vertical profile shown at 810a. This profile sees the aircraft 810 fly as high as possible for as long as possible before making a steep descent just in time to meet the maximum altitude prescribed for each waypoint.

Another airline may not like such an approach that sees the aircraft accelerate between level flight and descents a number of times. This second airline may prefer to fly a steady continuous descent with minimal changes in flight path angle. This approach may be reflected as an objective stored in the user preferences model 105. Intent generation engine 104 may retrieve this objective, and determine the vertical profile shown as 810b in FIG. 10. This vertical profile sees a steady descent with constant flight path angle from a calculated top of descent point TOD1 that passes through all the required altitude ranges.

As can be seen from FIG. 10, some variation in flight path angle may be made while still ensuring the altitude restrictions are met. Further objectives may guide the final selection of vertical profile. For example, the airline may have a further objective of flying continuous descent approaches with the throttles set to idle and with minimal deployment of speed brakes. This objective may then be used by the intent generation engine 104 to set an appropriate flight path angle.

Objectives to fly a constant flight path angle during descent and to fly continuous descent approaches at idle complement each other in that they both affect the vertical profile. At times, these objectives will cause a conflict in that both cannot be met. To avoid this, objectives may be prioritised such that the intent generation engine 104 can determine which objective is to be met where conflicts arise.

The airline may store restrictions in the user preferences model 105 as well as objectives. For example, as explained above, the lateral profile is defined in part by the waypoints specified in the STAR description in the operational context model 106. However, these restrictions leave open how the aircraft 810 makes the turns to meet the lateral position of each of waypoints ALPHA, BETA, GAMMA and DELTA. The airline may also set restrictions, for example not to exceed a certain bank angle for the benefit of passenger comfort. The intent generation engine 104 may retrieve this objective from the user preferences model 105 during the flight intent enrichment step 530. At step 550, this restriction may be used to set a parameter range for the bank angle which is then optimised at step 560.

Contemplated Applications

The present disclosure may find utility on any application that requires prediction of an aircraft's trajectory. For example, the trajectory computation infrastructure 110 may be provided as part of a flight management system of an aircraft. The flight management system may make use of the trajectory prediction facility when determining how the aircraft is to be flown.

A trajectory predicted as described in the preceding paragraph may be provided to air traffic management, akin to the provision of a detailed flight plan.

For an air-based trajectory computation infrastructure, the flight management system may have access to some of the information required to generate the aircraft intent. For example, airline preferences may be stored locally for retrieval and use. Moreover, the aircraft performance model 118 and Earth model 120 may be stored locally and updated as necessary. Further information may be input by the pilot, for example the particular SID, navigation route and STAR to be followed, as well as other preferences like when to deploy landing gear, change flap settings, engine ratings, etc. Some missing information may be assumed, e.g. flap and landing gear deployment times based on recommended airspeed.

All this required information may be acquired before a flight, such that the trajectory of the whole flight may be predicted. Alternatively, only some of the information may be acquired before the flight and the rest of the information may be acquired en route. This information may be acquired (or updated, if necessary) following a pilot input, for example in response to a change in engine rating or flight level. The trajectory computation infrastructure 110 may also update the predicted trajectory, and hence the aircraft intent as expressed in the aircraft intent description language, due to changes in the prevailing atmospheric conditions, as updated through the Earth model 120. Updates may be communicated via any of the types of well-known communication link 230 between the aircraft and the ground: the latest atmospheric conditions may be sent to the aircraft and the revised aircraft intent or predicted trajectory may be sent from the aircraft.

Air traffic management applications will be similar to the above described air-based system. Air traffic management may have information necessary to determine aircraft intent, such as flight procedures (SIDs, STARs, etc), information relating to aircraft performance (as an aircraft performance model), atmospheric conditions (as an Earth model), and possibly even airline preferences. Some information, such as pilot preferences relating to for example when to change the aircraft configuration, may be collected in advance of a flight or during a flight. Where information is not available, air traffic management may make assumptions in order for the aircraft intent to be generated and the trajectory to be predicted. For example, an assumption may be made that all pilots will deploy their landing gear ten nautical miles from a runway threshold or at a particular airspeed.

Air traffic management may use the predicted trajectories of aircraft to identify potential conflicts. Any potential conflicts may be resolved by advising one or more of the aircraft of necessary changes to their flight/aircraft intent.

The person skilled in the art will appreciate that variations may be made to the above described embodiments without departing from the scope of the invention defined by the appended claims.

The invention claimed is:

1. A computer-implemented method of generating a description of aircraft intent expressed in a formal language that provides an unambiguous description of an aircraft's intended motion and configuration during a period of flight, comprising:
   obtaining a description of flight intent corresponding to a flight plan spanning the period of flight;
   ensuring that the flight intent description is parsed to provide instances of flight intent, each instance of flight intent spanning a flight segment with the flight segments together spanning the period of flight;
   converting the parsed flight intent into parametric aircraft intent by generating an associated flight segment description for each flight segment that comprises instances of flight intent to close all associated degrees of freedom of motion and of configuration of the aircraft during the flight segment, wherein each instance of flight intent provides a description of the aircraft's motion in at least one degree of freedom of motion thereby closing the associated degree of freedom of motion and/or a description of the aircraft's configuration to close at least one degree of freedom of configuration, and wherein at least some flight segment descriptions contain a parameter range; and
   wherein the method further comprises optimising the parametric aircraft intent by determining an optimal value for the parameter of each parameter range.

2. The method of claim 1, wherein determining the optimal values comprises:
   generating initial parameter values thereby forming a model aircraft intent;
   calculating a trajectory from the model aircraft intent;
   calculating a merit function value for the trajectory using a merit function; and
   repeated iterations of amending the parameter values, calculating the resulting trajectory and calculating the resulting merit function value to determine whether the description of aircraft intent is improved, thereby optimising the parameter values by improving the merit function value.

3. The method of claim 2, wherein one or more flight segment descriptions contain an objective that is relevant to the associated flight segment, and the method further comprises using the one or more objectives to form the merit function.

4. The method of claim 3, further comprising comparing flight segment descriptions with objectives stored in a database and adding objectives to the flight segment description that are identified as being relevant to the flight segment description.

5. The method of claim 4, wherein at least some of the objectives are stored in a user preferences model that comprises information describing operational preferences.

6. The method of claim 4, wherein identifying objectives that are relevant to the flight segment description comprises identifying objectives associated with the aircraft.

7. The method of claim 6, wherein identifying objectives that are relevant to the flight segment description comprises identifying objectives associated with the aircraft by identifying objectives of the airline operating the aircraft, by identifying objectives pertaining to a phase of flight occurring during the corresponding flight segment, or by identifying objectives pertaining to airspace though which the aircraft will pass during the corresponding flight segment.

8. The method of claim 1, wherein the description of flight intent obtained includes a description of a set of initial conditions of the aircraft at the start of the period of flight.

9. The method of claim 1, further comprising obtaining a description of a set of initial conditions of the aircraft at the start of the period of flight and ensuring that the flight intent description and the initial conditions are parsed to provide the instances of flight intent.

10. The method of claim 1, further comprising calculating a trajectory for the period of flight from the aircraft intent.

11. The method of claim 10, further comprising causing the aircraft to fly that trajectory or comparing the trajectory with trajectories of other aircraft to identify conflicts.

12. A system for generating a description of aircraft intent expressed in a formal language that provides an unambiguous description of an aircraft's intended motion and configuration during a period of flight, the system comprising:
   a processor;
   a storage medium comprising instructions thereon, that when executed by said processor, cause the processor to:
   obtain a description of flight intent corresponding to a flight plan spanning the period of flight;
   ensure that the flight intent description is parsed to provide instances of flight intent, each instance of flight intent spanning a flight segment with the flight segments together spanning the period of flight;
   convert the parsed flight intent into parametric aircraft intent by generating an associated flight segment description for each flight segment that comprises instances of flight intent to close all associated degrees of freedom of motion and of configuration of the aircraft during the flight segment, wherein each instance of flight intent provides a description of the aircraft's motion in at least one degree of freedom of motion thereby closing the associated degree of freedom of motion and/or a description of the aircraft's configuration to close at least one degree of freedom of configuration, and wherein at least some flight segment descriptions contain a parameter range; and
   optimize the parametric aircraft intent by determining an optimal value for the parameter of each parameter range.

13. The system of claim 12, wherein said storage medium further comprises instructions thereon, that when executed by said processor, cause the processor to:
   generate initial parameter values thereby forming a model aircraft intent;
   calculate a trajectory from the model aircraft intent;
   calculate a merit function value for the trajectory using a merit function; and
   repeat iterations of amending the parameter values, calculating the resulting trajectory and calculating the resulting merit function value to determine whether the description of aircraft intent is improved, thereby optimising the parameter values by improving the merit function value.

14. The system of claim 13, wherein one or more flight segment descriptions contain an objective that is relevant to the associated flight segment, and the system further comprises using the one or more objectives to form the merit function.

15. The system of claim 14, wherein said storage medium further comprises instructions thereon, that when executed by said processor, cause the processor to:
   compare flight segment descriptions with objectives stored in a database; and add objectives to the flight segment description that are identified as being relevant to the flight segment description.

16. The system of claim 15, wherein said storage medium further comprises instructions thereon, that when executed by said processor, cause the processor to store at least some of the objectives in a user preferences model that comprises information describing operational preferences.

17. The system of claim 15, wherein identifying objectives that are relevant to the flight segment description comprises identifying objectives associated with the aircraft.

18. The system of claim 17, wherein identifying objectives associated with the aircraft comprises identifying an objective of the airline operating the aircraft, identifying an objective pertaining to a phase of flight occurring during the corresponding flight segment, or identifying an objective pertaining to airspace though which the aircraft will pass during the corresponding flight segment, or combinations thereof.

19. An aircraft comprising:
 a processor;
 a storage medium comprising instructions thereon, that when executed by said processor, cause the processor to:
 obtain a description of flight intent corresponding to a flight plan spanning a period of flight;
 ensure that the flight intent description is parsed to provide instances of flight intent, each instance of flight intent spanning a flight segment with the flight segments together spanning the period of flight;
 convert the parsed flight intent into parametric aircraft intent by generating an associated flight segment description for each flight segment that comprises instances of flight intent to close all associated degrees of freedom of motion and of configuration of the aircraft during the flight segment, wherein each instance of flight intent provides a description of the aircraft's motion in at least one degree of freedom of motion thereby closing the associated degree of freedom of motion and/or a description of the aircraft's configuration to close at least one degree of freedom of configuration, and wherein at least some flight segment descriptions contain a parameter range;
 optimize the parametric aircraft intent by determining an optimal value for the parameter of each parameter range; and
 calculate a trajectory for the aircraft for the period of flight from the aircraft intent.

20. A tangible computer readable storage medium having recorded thereon instructions for generating a description of aircraft intent expressed in a formal language that provides an unambiguous description of an aircraft's intended motion and configuration during a period of flight that, when executed on a computer, cause the computer to:
 obtain a description of flight intent corresponding to a flight plan spanning the period of flight;
 ensure that the flight intent description is parsed to provide instances of flight intent, each instance of flight intent spanning a flight segment with the flight segments together spanning the period of flight;
 convert the parsed flight intent into parametric aircraft intent by generating an associated flight segment description for each flight segment that comprises instances of flight intent to close all associated degrees of freedom of motion and of configuration of the aircraft during the flight segment, wherein each instance of flight intent provides a description of the aircraft's motion in at least one degree of freedom of motion thereby closing the associated degree of freedom of motion and/or a description of the aircraft's configuration to close at least one degree of freedom of configuration, and wherein at least some flight segment descriptions contain a parameter range; and optimize the parametric aircraft intent by determining an optimal value for the parameter of each parameter range.

* * * * *